May 28, 1940.                C. DREYFUS ET AL                2,201,992
                    TREATMENT OF TEXTILE YARNS AND FILAMENTS
                              Filed March 25, 1939
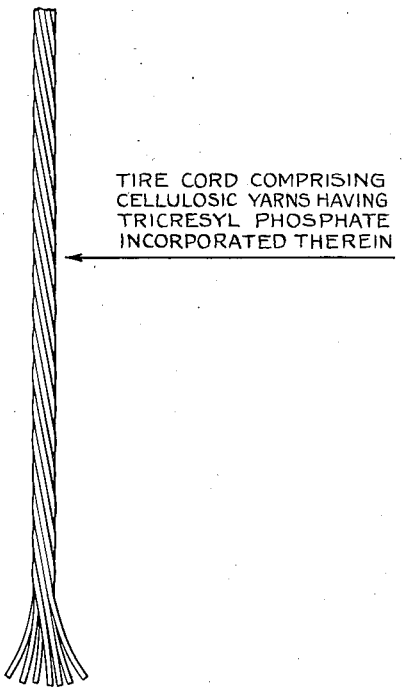
TIRE CORD COMPRISING
CELLULOSIC YARNS HAVING
TRICRESYL PHOSPHATE
INCORPORATED THEREIN
INVENTORS
CAMILLE DREYFUS
GEORGE SCHNEIDER
ATTORNEYS Patented May 28, 1940

2,201,992

UNITED STATES PATENT OFFICE 2,201,992

TREATMENT OF TEXTILE YARNS AND FILAMENTS

Camille Dreyfus, New York, N. Y., and George Schneider, Montclair, N. J., assignors to Celanese Corporation of America, a corporation of Delaware Application March 25, 1939, Serial No. 264,120

18 Claims. (Cl. 57—140)

This invention relates to the treatment of textile yarns, filaments and the like made of cellulosic materials, particularly those made of or containing regenerated cellulose or cotton, in order to improve their properties.

An object of this invention is the treatment of cellulosic yarns or filaments in order to improve their wearing qualities.

Another object of this invention is the treatment of yarns or filaments made of or containing regenerated cellulose or cotton so as to render them more suitable for use in the manufacture of tire cords.

A further object of this invention is the improvement of the resistance to fatigue of yarns or filaments made of or containing regenerated cellulose or cotton used in the manufacture of tire cords by treating such yarns or filaments with tricresyl phosphate. Other objects and advantages of the invention will appear from the following detailed description and the claims.

The drawing represents a tire cord comprising cellulosic yarns having tricresyl phosphate incorporated therein.

We have found that the treatment of cellulosic yarns or filaments with tricresyl phosphate, with or without other lubricants, and the retention of said materials in the yarns or filaments has an unexpectedly beneficial effect on the yarns. This is particularly true where said yarns are made of or contain regenerated cellulose or cotton and are used in the manufacture of cords for automobile tires, for we have found that yarns thus treated have a greatly improved resistance to fatigue.

Various types of yarns and threads have been used for the manufacture of tire cords with varying degrees of success. However, even where yarns having a high tenacity were employed it was found that the tire cords made with such yarns did not have the strength and/or flexibility expected and desired. These cords were found to lose their "liveliness" a very short time after the tires in which they were incorporated were subjected to actual use.

As a result of considerable experimentation we have discovered that this loss of "liveliness" is due to the fact that the yarns during the cord formation and the embedding of the same in the rubber are subjected to considerable strains. This causes the yarns to become "fatigued" or weakened. It is this fatiguing of the individual yarns, we have found, which causes the tire to have a comparatively short life.

We have now found that this serious defect in tire cords can be easily and economically remedied. We have found that if yarns or filaments made of or containing regenerated cellulose or cotton are treated with lubricant compositions containing tricresyl phosphate and the tricresyl phosphate retained throughout the cord and tire forming operations, a much improved product is obtained. Not only is the cord formation facilitated but the resultant tire has an improved liveliness which is retained under working conditions. This of course results in a much longer life for the tire.

We have found that the tricresyl phosphate present in cellulosic filaments or threads which are used in the manufacture of tire cords has an unexpectedly beneficial effect on the tire cords. Not only is the formation of the tire cord itself facilitated by the presence of the tricresyl phosphate but the tires made with such tire cords retain their liveliness for a long period of time, thereby increasing the life of the tire. The tricresyl phosphate may be used alone or it may be admixed in various proportions with other ingredients such as mineral oils, sulphonated vegetable oils, animal oils, soaps and the like before being applied to the cellulosic filaments or threads. The tricresyl phosphate, where desired, can be mixed with diluents. The diluents and other ingredients should be such as will have no deleterious effect on the rubber even at the temperatures used in the vulcanization.

The tricresyl phosphate composition may be applied to the regenerated cellulose or cotton yarns before, during or after any textile operation to which they are subjected. Thus the composition may be applied to the yarns or filaments during any winding or twisting operation by passing the same in contact with a wick, roller, disc or other furnishing device that dips into the composition. The yarns or filaments may be drawn through a solution or emulsion of the tricresyl phosphate or the solution or emulsion may be sprayed upon the yarn. The tricresyl phosphate may also be applied to the yarns or filaments in hank form by hand dipping methods, or the yarns may be lubricated by padding or spraying after they have been formed into a cord.

The amount of tricresyl phosphate applied will vary with the type of yarn and especially with the type of cord into which it is to be converted. Thus heavy duty cords such as are used in the manufacture of truck tires will require a higher proportion of tricresyl phopshate than will cords which are to be used in a tire for a passenger automobile. We have found that excellent results are obtained where 0.5 to 5.0% of tricresyl phosphate or mixtures of same with oils or diluents based on the weight of the yarn is applied to and/or retained by the yarn.

While we have described our invention with reference to the yarns of regenerated cellulose generally and cotton, we have obtained the best results with regenerated cellulose yarns which have been obtained by stretching cellulose acetate yarns up to 200 to 500% and subsequently substantially completely saponifying the stretched yarn. We have found that such yarns have a much higher tenacity than ordinary regenerated cellulose yarns. Yarns of cellulose esters other than cellulose acetate gave similar results. Where desired the stretched yarn can be shrunk between the stretching and saponifying operations, this modification resulting in a slightly improved yarn.

The following are examples of applications of the invention, it being understood that these are given by way of illustration only.

*Example I*

Travelling yarns of regenerated cellulose of about 270 denier obtained by the saponification of a cellulose acetate yarn whose filaments had been stretched about 200%, having a twist of about 5 turns per inch, are contacted with a wick which dips into a bath of tricresyl phosphate. The wick is adjusted so that 0.75 to 2% of the tricresyl phosphate, on the basis of the weight of the yarn, is retained by the travelling yarn. The yarn is found to be uniformly and evenly impregnated with the tricresyl phosphate.

Yarns thus treated are plyed by twisting four ends together 14 turns per inch, left. Three plys thus formed are then twisted about 12 turns per inch, right, in order to obtain a cable suitable for cords in tire manufacture. The travelling yarn after it receives the tricresyl phosphate may pass directly to the plying and cabling machines.

*Example II*

Yarns such as described in Example I are subjected to the same treatments and operations except that the composition applied comprises a 50% solution of tricresyl phosphate in a light mineral oil.

*Example III*

Yarns such as described in Example I are subjected to the same treatments and operations except that the composition employed has the following composition:

| | Parts by weight |
|---|---|
| White mineral oil, 60 to 75 seconds viscosity | 70.0 |
| Oil-soluble sulphonated olive oil | 5.0 |
| Sperm oil | 2.5 |
| Tricresyl phosphate | 8.4 |
| Oleic acid | 9.2 |
| Triethanolamine | 4.9 |

In all of the above cases it was found that the treated yarns when incorporated in a tire showed markedly improved resistance to fatiguing when subjected to the mechanical flexing and loading tests as compared with similar yarns untreated. As previously pointed out, other compositions can also be used as long as they contain tricresyl phosphate and are compatible with rubber and do not have a deleterious effect thereon, even under vulcanizing conditions. Likewise other types of yarns may be employed. The term "yarns" as employed in the claims is to be considered as embracing filaments.

It is to be understood that the foregoing detailed description is merely given by way of illustration and that many variations may be made therein without departing from the spirit of our invention.

Having described our invention, what we desire to secure by Letters Patent is:

1. Process for the manufacture of tire cords which comprises applying tricresyl phosphate to cellulosic yarns, twisting several ends of said yarn together while they still retain the tricresyl phosphate and then twisting a plurality of said twisted ends to form a cable.

2. Process for the manufacture of tire cords which comprises applying a tricresyl phosphate composition to yarns of regenerated cellulose, twisting several ends of said yarn together while they still retain the tricresyl phosphate and then twisting a plurality of said twisted ends to form a cable.

3. Process for the manufacture of tire cords which comprises applying a tricresyl phosphate composition to cotton yarns, twisting several ends of said yarn together while they still retain the tricresyl phosphate and then twisting a plurality of said twisted ends to form a cable.

4. Process for the manufacture of tire cords which comprises applying a lubricant comprising tricresyl phosphate to high tenacity yarns of regenerated cellulose, twisting several ends of said yarn together while they still retain the tricresyl phosphate and then twisting a plurality of said twisted ends to form a cable.

5. Process for the manufacture of tire cords which comprises applying tricresyl phosphate to high tenacity yarns of regenerated cellulose, twisting several ends of said yarn together while they still retain the tricresyl phosphate and then twisting a plurality of said twisted ends to form a cable.

6. Process for the manufacture of tire cords which comprises applying a composition comprising tricresyl phosphate and a mineral oil to cellulosic yarns, twisting several ends of said yarn together while they still retain the tricresyl phosphate and mineral oil and then twisting a plurality of said twisted ends to form a cable.

7. Process for the manufacture of tire cords which comprises applying a lubricant comprising tricresyl phosphate and a mineral oil to high tenacity yarns of regenerated cellulose, twisting several ends of said yarn together while they still retain the tricresyl phosphate and mineral oil and then twisting a plurality of said twisted ends to form a cable.

8. Process for the manufacture of tire cords which comprises applying 0.5 to 5.0%, based on the weight of the yarn, of tricresyl phosphate to cellulosic yarns, twisting several ends of said yarn together while they still retain the tricresyl phosphate and then twisting a plurality of said twisted ends to form a cable.

9. Process for the manufacture of tire cords which comprises applying 0.75 to 2.0%, based on the weight of the yarn, of tricresyl phosphate to cellulosic yarns, twisting several ends of said yarn together while they still retain the tricresyl phosphate and then twisting a plurality of said twisted ends to form a cable.

10. Process for the manufacture of tire cords which comprises applying 0.75 to 2.0%, based on the weight of the yarn, of tricresyl phosphate to high tenacity yarns of regenerated cellulose, twisting several ends of said yarn together while they still retain the tricresyl phosphate and then twisting a plurality of said twisted ends to form a cable.

11. Tire cords of improved strength and increased resistance to fatigue, comprising cellulosic yarns having tricresyl phosphate incorporated therein.

12. Tire cords of improved strength and increased resistance to fatigue, comprising regenerated cellulose yarns having tricresyl phosphate incorporated therein.

13. Tire cords of improved strength and increased resistance to fatigue, comprising cotton yarns having tricresyl phosphate incorporated therein.

14. Tire cords of improved strength and increased resistance to fatigue, comprising high tenacity yarns of regenerated cellulose, said regenerated cellulose yarns having a lubricant comprising tricresyl phosphate incorporated therein.

15. Tire cords of improved strength and increased resistance to fatigue, comprising high tenacity yarns of regenerated cellulose, said regenerated cellulose yarns having a lubricant comprising tricresyl phosphate and mineral oil incorporated therein.

16. Tire cords of improved strength and increased resistance to fatigue, comprising cellulosic yarns having 0.5 to 5.0%, based on the weight of the yarn, of tricresyl phosphate incorporated therein.

17. Tire cords of improved strength and increased resistance to fatigue, comprising cellulosic yarns having 0.5 to 5.0%, based on the weight of the yarn, of tricresyl phosphate and mineral oil incorporated therein.

18. Tire cords of improved strength and increased resistance to fatigue, comprising high tenacity yarns of regenerated cellulose, said regenerated cellulose yarns having incorporated therein 0.75 to 2.0% of tricresyl phosphate, based on the weight of the yarn.

CAMILLE DREYFUS.
GEORGE SCHNEIDER.